March 17, 1970
I. A. SPEELMAN
3,501,228
MULTI-FOCUS OPHTHALMOSCOPE
Filed Nov. 13, 1967
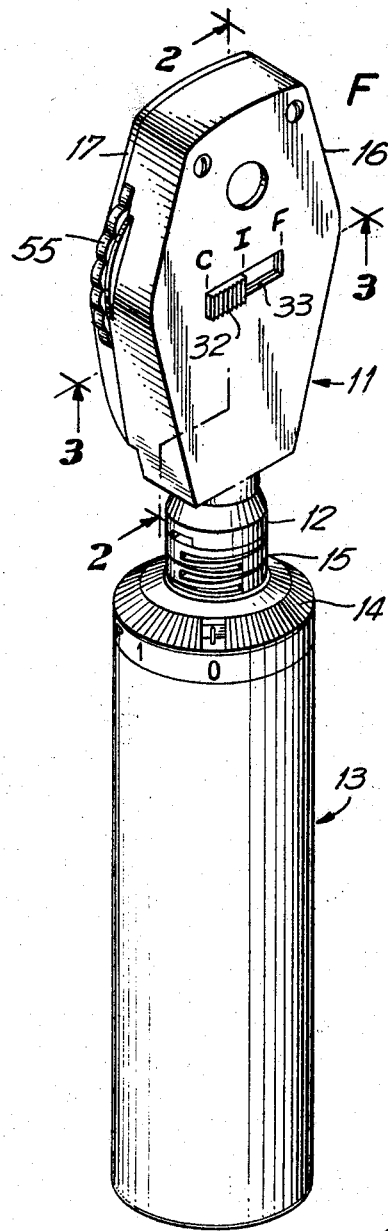
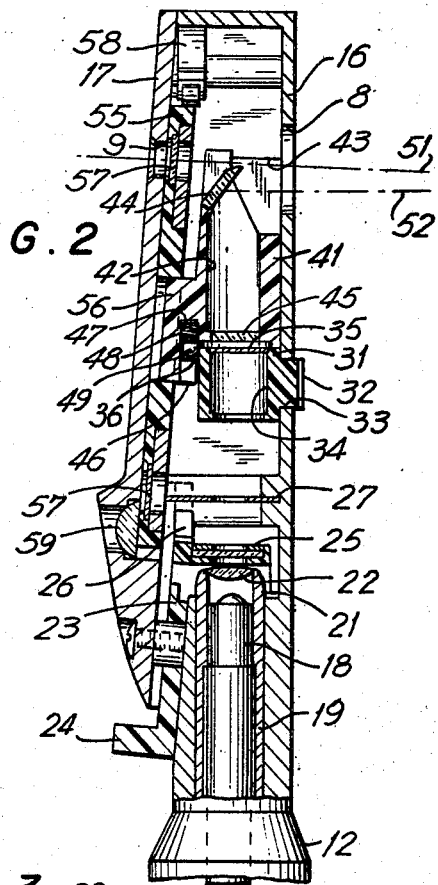
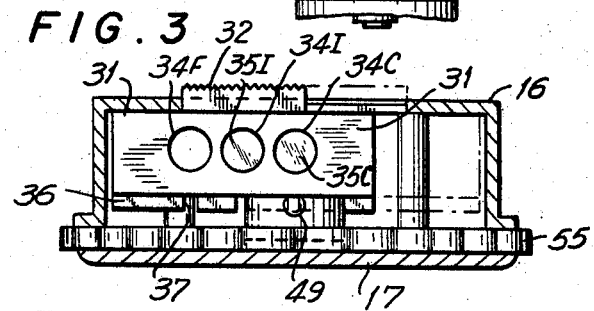
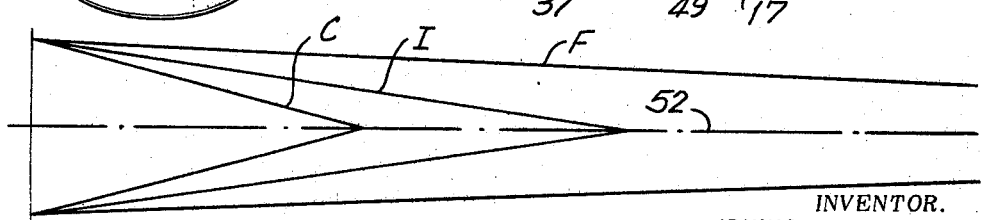
INVENTOR.
IRVING A. SPEELMAN
BY
ATTORNEYS United States Patent Office 3,501,228
Patented Mar. 17, 1970

3,501,228
MULTI-FOCUS OPHTHALMOSCOPE
Irving A. Speelman, Roslyn Heights, N.Y., assignor to Propper Manufacturing Co., Inc., Long Island City, N.Y., a corporation of New York
Filed Nov. 13, 1967, Ser. No. 682,085
Int. Cl. A61b 3/12
U.S. Cl. 351—16                    1 Claim

ABSTRACT OF THE DISCLOSURE

An opthalmoscope for opthalmological examination which projects an illuminating beam from a light source substantially on a sight axis which utilizes a lense system which maximizes the intensitity of illumination and permits multiple focal points of the light beam.

BACKGROUND OF THE INVENTION

This invention generally relates to an opthalmoscope with which a physician can perform opthalmological examinations. Such devices have a sight passage through which the physician may look and an internal light source adapted to project light in close proximity to the sight axis in order to illuminate the portions of the eye being examined by the physician. In the prior art devices, a lens system is used to focus the light from the lamp source at a distance from the device to illuminate the areas to be examined. However, since the areas to be examined may vary in distance from the device, the focus of the lens system may not be optimum for all areas to be examined, and may not make optimum use of available illumination.

SUMMARY OF THE INVENTION

Generally speaking, in accordance with the invention, the lens system is so arranged as to make maximum utilization of the light source, while providing mutiple focal points for the light beam selectively controllable by the examining physician. From experience, three focal points are deemed preferably although the invention is not limited thereto.

Accordingly, it is an object of this invention to provide an improved ophthalmoscope having a light source adapted to be focused substantially along a slight axis at multiple focus points.

Another object of this invention is to provide an improved multiple focus ophthalmoscope.

A further object of the invention is to provide a multi-focus ophthalmoscope having improved means for making maximum utilization of available illumination.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which:

FIG. 1 is a perspective view of an ophthalmoscope constructed in accordance with a preferred embodiment of the instant invention and showing the ophthalmoscope mounted to a battery handle;

FIG. 2 is a sectional view taken along line 2—2 of FIG. 1;

FIG. 3 is a sectional view taken along line 3—3 of FIG. 1; and

FIG. 4 is a schematic representation of multiple light focus points.

DESCRIPTION OF THE PREFERRED EMBODIMENT

Referring now to FIG. 1, an ophthalmoscope or ophthalmoscope head 11 includes a mounting collar 12 through which it is removably mounted to a battery handle 13. The battery handle is of any known type for supplying power to illuminate the light source located within the ophthalmoscope head. The battery handle includes a switch ring 14 for controlling battery current to the light source. A spring ring 15 of known construction also forms part of the battery handle and aids in releasably securing the collar to the handle.

Referring now to FIGS. 1 through 3, the ophthalmoscope head has an outer casing 16 in which the various operative components are mounted with the casing being closed by a cover plate 17. Extending into the casing at the lower end of the head through collar 12 is a bulb 18 mounted in a support tube 19 with the support tube and bulb being removable for replacement of the bulb. The head of the bulb is received in a dome 21 which carries a first lens 22. Mounted immediately above lens 22, is a grid disc 23 pivoted on the casing and controlled externally by a finger 24. The grid disc carries an arcuate plate 25 located immediately above lens 22 and provided with filters, grids and apertures which may be selectively interposed in the light path for various examination techniques, all as well known in the art. A spring 26 carried by the casing acts against the grid disc in the manner of a detent to releasably secure the disc in various selected positions as determined by the actuation of finger 24. An apertured plate 27 is located above plate 25 with the aperture along the light axis. A slide block 31 is mounted within the casing for transverse movement with respect to the light axis. The slide block includes a serrated control finger 32 which extends through an elongated aperture 33 whereby the position of the slide block may be externally controlled through the finger. The slide block is provided with multiple cylindrical passages 34 which may be selectively interposed along the light axis. The number of passages is determined by the desired number of light focus points in the preferred embodiment, three passages are shown. A tri-focal ophthalmoscope is considered to provide maximum versatility for the examining instrument. During an examination, the physician examines all portions of the eye and the distances from the instrument will vary greatly. For optimum illumination and definity, it would be desirable to have the light focused precisely on each portion being examined. This, of course, would require an infinite focus instrument which would not be practical. When using grid images by means of a grid in plate 25, focus also becomes important in order that the projected grid image be defined with clarity. While movement of the instrument toward or from the patient's eye will have some effect on focus, the preferred examination procedure is to bring the ophthalmoscope as close as possible to the patient's eye without touching same and thus multiple focus improves the examining position of the instrument. For example, a focus of about 25 mm. in front of the instrument provides the proper focus for observation of the anterior segment of the eyeball and the external surface features of the eye. A focus at infinity is appropriate for clear observation of the fundus. For observation of intermediate areas, an intermediate focus is desirable and a focus at about 80 mm. has been found preferable. The three focus points may be selected by the examiner with suitable indicia indicated on the rear of the casing as shown in FIG. 1. The letter "C" indicates the close focus of about 35 mm., the letter "I" indicates the intermediate focus at about 80 mm. and the letter "F" indicates the far focus at infinity. The three focal points for the preferred embodiment are indicated schematically in FIG. 4.

Returning now to FIGS. 2 and 3, the three cylindrical passages 34 represent the three focal points. Passage 34F would be a clear passage without a focusing lens for the focus at infinity. A lens 35I would be mounted in passage 34I for intermediate focus and a lens 35C would be mounted in passage 34C for close focus.

The rear portion of slide block 31 rests against the inner surface of the rear wall of casing 16 and the upper forward edge of the slide block has projecting therefrom a V-shaped lip 36 provided with notches at spaced intervals, the number of notches being equal to the number of cylindrical passages since the notches acts as detent points for the focus selection.

A fixed block 41 is secured to the rear wall of casing 16 and is provided with a vertical passage 42 and a horizontal passage 43 which intersect at a reflecting mirror 44. While a reflecting mirror is deemed preferable for the reflection of the light along the sight axis, as will be hereafter described, a prism may be substituted for the reflecting mirror, if desired. An additional lens 45 is carried at the lower end of vertical passage 42.

Fixed block 41 includes a depending skirt 46 grooved so as to receive lip 36. A bore 47 has mounted therein a spring 48 and a ball 49 biased into contact with the surface of lip 36 by means of the spring. The skirt acts to support one end of slide block 31, the other end being supported through finger 32 and aperture 33. The slide block may freely slide transversely of the ophthalmoscope head with a releasable detent position occurring when ball 49 is biased into a notch 37 by spring 48. Thus, while the slide block may be manually moved through finger 32, the positions corresponding to the various focal points can be "felt" as the focus is being adjusted and the slide block will remain in any selected position as a result of the detent action. An aperture 8 through the rear wall of casing 16 overlaps passage 43 and thus the light from bulb 18, when illuminated, travels upwardly through the lens system and is reflected outwardly of the ophthalmoscope head by mirror 44 through aperture 8, with the focus of the light source depending on the position of finger 32. Cover plate 17 is also provided with an aperture 9 which, when taken with aperture 8, defines the sight axis for the examining physician. The sight axis is indicated as 51 in FIG. 2 and the light axis is indicated as 52 in FIG. 4. It will be evident that it is desirable to have light and sight axes as close to coaxial as possible.

An ophthalmoscope head also preferably includes a Rekoss disc for correcting spherical error in the examiner's eye. The Rekoss disc is rotatably mounted on a post 56 formed as part of block 41 and is provided with a plurality of circumferentially spaced lenses 57 in a range of diopters whereby the disc may be rotated to bring the proper lens into position in the path of sight axis 51 to compensate for refractive errors in the eyes of the examiner as well as the patient. A spring detent 58 acts against the periphery of the Rekoss disc for releasably holding the disc in any selected position. The outer surface of the disc is also preferably provided with indicia corresponding to the various lenses and a magnifying lens 59 carried by the cover plate permits the indicia to be easily read.

By providing multiple focus of the light source, an ophthalmoscope of greater versatility and usefulness results. In addition, the provision of dome 21 carrying lens 22 permits maximum utilization of the light source in that substantially all the light will be focused through lens 22 thereby minimizing stray light loss. This results in an instrument having greater illuminating properties than prior art instruments using the same bulb and the same power source. The improvement derives from the placement of lens 22 in close proximity to the bulb so that the maximum amount of light energy will enter and be focused by the lens system.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

What is claimed is:

1. An ophthalmoscope head comprising a casing, aperture means in said casing defining a sight axis, illuminating means carried by said casing and including a light source for defining a light axis and for projecting a beam of light and directing same along said light axis, a portion of said light axis including said sight axis, and a focusing system in said casing for focusing said beam of light along said light axis, said focusing system including a member carried by said casing and movable with respect to said light source and multiple focus controlling means carried by said member and positionable into and out of the path of the beam of light, whereby to change the focus along the light axis, said multiple focus controlling means including at least three passages in said member, one of said passages being unobstructed, and the remaining passages each being provided with a lens, said member including a control finger extending exteriorly of said casing for controlling the movement of said member, said member including detent means cooperating with said casing for releasably holding said member in a selected position of focus, said detent means including coacting surfaces on said casing and said member, one of said surfaces having a detent member resiliently mounted therein and the other of said surfaces being provided with multiple notches for receiving said detent member, the number of said notches being equal to the number of said passages, said member being provided with a lip extending therefrom, said lip carrying said notches, said casing being provided with a groove slidably engaged by said lip for slidably supporting one side of said member, the opposite side of said member including said control finger projecting outwardly through an elongated slot in said casing to slidably support said member in said casing at said opposite side thereof, said focusing system including a dome, a passage through said dome, a first lens mounted in said passage, said light source being mounted in said passage with the illuminating end thereof proximate to said first lens, a block fixedly mounted in said casing and having intersecting passages therein, the longitudinal axis of one of said passages being coaxial with the longitudinal axis of said passage in said dome, and means for transmitting light from one of said passages in said block to the other of said passages in said block, said multiple passages in said member each having a longitudinal axis parallel to the longtiudinal axis of said passage in said dome, each of the axes of said passages in said member being selectively positionable to be coaxial wtih said passage in said dome.

(References on following page)

References Cited

UNITED STATES PATENTS

| 1,774,832 | 9/1930 | Keeler | 351—13 X |
| 2,269,962 | 1/1942 | Wappler | 351—12 X |
| 2,785,598 | 3/1957 | Kirchhübel | 351—12 |

DAVID SCHONBERG, Primary Examiner
PAUL A. SACHER, Assistant Examiner

U.S. Cl. X.R.

351—6, 9